(12) United States Patent
Kirita

(10) Patent No.: US 8,947,725 B2
(45) Date of Patent: Feb. 3, 2015

(54) PRINTER

(75) Inventor: Kouji Kirita, Tokyo (JP)

(73) Assignee: Sato Holdings Kabushiki Kaisha (JP)

( * ) Notice: Subject to any disclaimer, the term of this patent is extended or adjusted under 35 U.S.C. 154(b) by 0 days.

(21) Appl. No.: 14/111,204

(22) PCT Filed: Apr. 13, 2012

(86) PCT No.: PCT/JP2012/002595
§ 371 (c)(1),
(2), (4) Date: Oct. 11, 2013

(87) PCT Pub. No.: WO2012/140914
PCT Pub. Date: Oct. 18, 2012

(65) Prior Publication Data
US 2014/0036280 A1    Feb. 6, 2014

(30) Foreign Application Priority Data

Apr. 13, 2011  (JP) ................. 2011-088975

(51) Int. Cl.
| | | |
|---|---|---|
| *G06K 1/00* | (2006.01) | |
| *G06K 15/02* | (2006.01) | |
| *B41J 3/01* | (2006.01) | |
| *B41J 3/407* | (2006.01) | |
| *G06K 1/12* | (2006.01) | |

(Continued)

(52) U.S. Cl.
CPC .............. *G06K 15/1867* (2013.01); *B41J 3/01* (2013.01); *B41J 3/4075* (2013.01); *G06K 1/121* (2013.01); *G06K 15/16* (2013.01); *B41J 11/42* (2013.01); *G06K 5/00* (2013.01); *G06K 15/024* (2013.01)
USPC .......... 358/1.6; 358/1.2; 358/1.9; 235/462.01; 347/211; 347/107

(58) Field of Classification Search
None
See application file for complete search history.

(56) References Cited

U.S. PATENT DOCUMENTS 4,996,539 A * 2/1991 Haraga et al. ................. 347/192
5,025,397 A * 6/1991 Suzuki ......................... 358/1.18

(Continued)

FOREIGN PATENT DOCUMENTS

| JP | 2002-178577 | 6/2002 |
| JP | 2005-164655 | 6/2005 |
| JP | 2007-323498 | 12/2007 |

OTHER PUBLICATIONS

International Search Report dated May 22, 2012 issued in corresponding International patent application No. PCT/JP2012/002595.

(Continued)

*Primary Examiner* — Ashish K Thomas
(74) *Attorney, Agent, or Firm* — Ostrolenk Faber LLP

(57) ABSTRACT

A label printer prints a QR code on print areas (labels) sequentially arranged along a sheet of paper while maintaining the QR code in a state in which its data can be restored. The label printer determines, in the course of separating the printed label and suspending and resuming movement of the paper and while printing on each label of the paper, whether or not both of two finder patterns aligned along one side of the QR code in a following print area are at a position to be printed when a boundary portion between a leading label that has been printed and the following label reaches a cut position. A print operation correcting control controls printing when both of two finder patterns aligned along one side of the QR code are in position to be printed, but not printed at the same time.

10 Claims, 11 Drawing Sheets

(51) Int. Cl.
*G06K 15/16* (2006.01)
*B41J 11/42* (2006.01)
*G06K 5/00* (2006.01)

(56) References Cited

U.S. PATENT DOCUMENTS

| | | | | |
|---|---|---|---|---|
| 5,207,516 A | * | 5/1993 | Suzuki | 400/555 |
| 5,248,993 A | * | 9/1993 | Oshino et al. | 347/211 |
| 5,448,685 A | * | 9/1995 | Ogura et al. | 358/1.18 |
| 6,129,462 A | | 10/2000 | Furuya | 400/61 |
| 6,535,299 B1 | * | 3/2003 | Scherz | 358/1.18 |
| 6,672,510 B2 | * | 1/2004 | Sauve | 235/462.07 |
| 7,181,066 B1 | * | 2/2007 | Wagman et al. | 382/183 |
| 7,692,812 B2 | * | 4/2010 | Schoedinger et al. | 358/1.18 |
| 7,988,037 B2 | * | 8/2011 | Yach | 235/375 |
| 8,061,615 B2 | * | 11/2011 | Yada | 235/462.08 |
| 8,130,407 B2 | * | 3/2012 | Nose et al. | 358/1.18 |
| 2004/0057768 A1 | | 3/2004 | Oshino | 400/103 |
| 2007/0013950 A1 | | 1/2007 | Kajihara | 358/1.18 |

OTHER PUBLICATIONS

Supplementary European Search Report, dated Aug. 26, 2014 issued in corresponding European Patent Application No. EP 12771561.3. Total 4 pages.

* cited by examiner

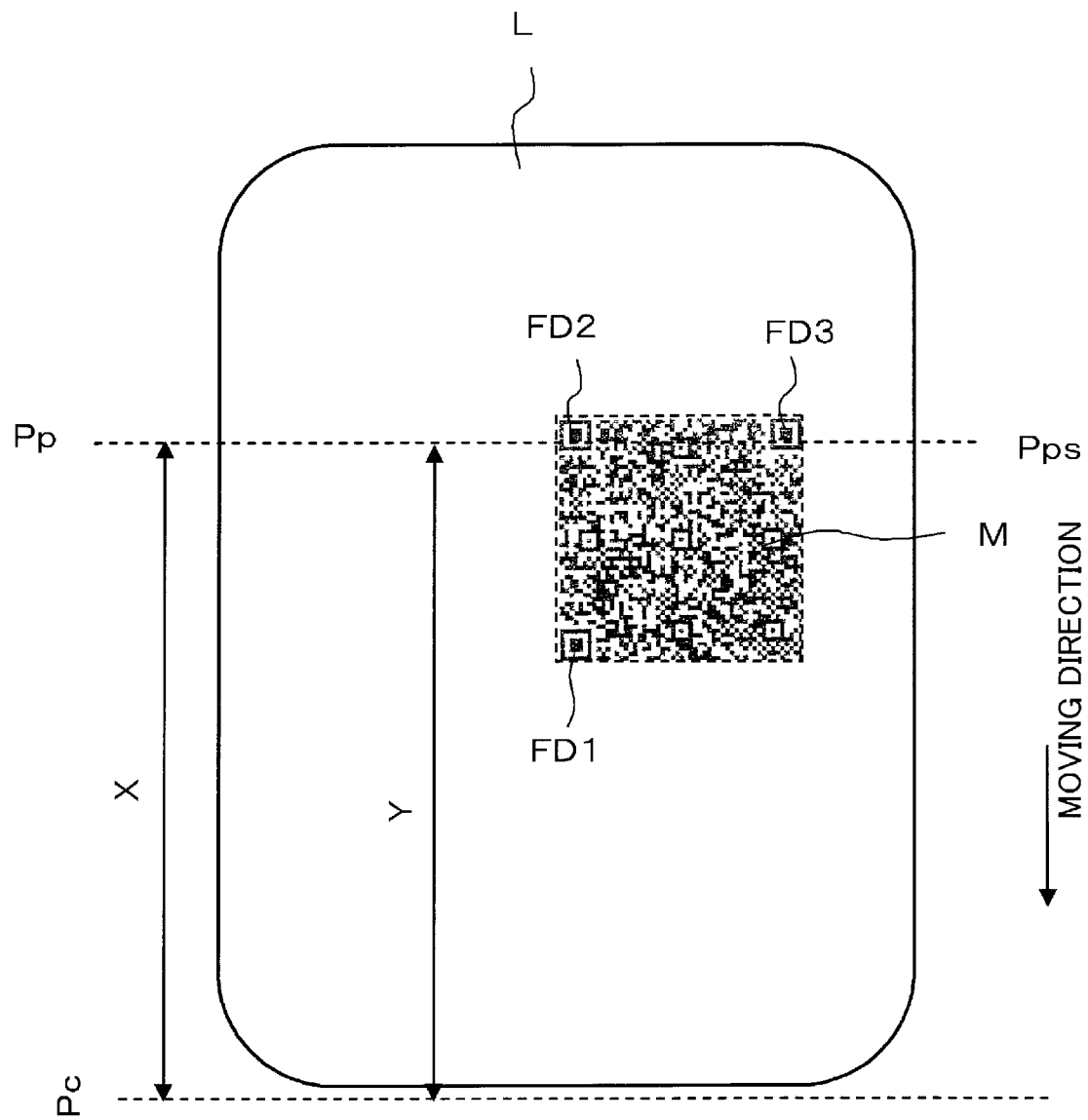

PRINTER

CROSS-REFERENCE TO RELATED APPLICATIONS

The present application is a 35 U.S.C. §§371 national phase conversion of PCT/JP2012/002595, filed Apr. 13, 2012, which claims priority of Japanese Patent Application No. 2011-088975, filed Apr. 13, 2011, the contents of which are incorporated by reference herein. The PCT International Application was published in the Japanese language.

TECHNICAL FIELD

The present invention relates to a printer capable of performing printing to print areas arranged at regular intervals along a sheet of paper, while moving the paper sequentially in a direction of the arrangement of the print areas. For example, the invention concerns a label printer capable of performing printing on labels of a sheet of paper having a liner. The labels are temporarily attached to the liner at regular intervals. The labels are separated after they are printed from the paper during movement of the paper.

BACKGROUND ART

Conventionally, a label printer described in Patent Literature 1 has been known. According to this label printer, during movement of a sheet of paper having a liner and labels temporarily attached to the liner at regular intervals, a print head (specifically, a thermal head) prints letters or marks according to print data on each of the labels that passes a print position. In printing letters or marks according to the print data on a following label that passes the print position in a similar manner after completion of printing on a leading label, when a boundary portion between the leading label that has been printed and the following label comes at a cut position, the paper stops moving and printing on the following label is suspended, the paper is cut at the boundary portion and the leading label that has been printed is separated. Then, feeding of the paper is resumed, and printing on the label for which the printing is suspended, is also resumed.

Further, where information to be printed according to the print data includes a bar code, then after completion of printing on the leading label, the movement of the paper continues without performing printing on the following label that passes the print position. Then, when the boundary portion between the leading label that has been printed and the following label comes to the cut position, the paper stops moving and is cut at the boundary portion and, the leading label that has been printed is separated. Subsequently, the paper moves in a reverse direction (backward) such that a leading end of the following label (a new leading label) comes at the print position. Then, again, printing on this following label is performed while the paper moves in a regular (forward) direction. Thereafter, printing on each label is similarly performed by repeating printing on a label, cutting of the paper, and moving of the paper in a reverse direction.

According to such a conventional printer (label printer) described above, if the information to be printed does not include a bar code, during sequential printing on the labels, feeding of the paper and printing on the following label are suspended when separating the leading label and resumed after the leading label is separated. Therefore, it is possible to perform printing to the labels sequentially arranged along the liner at higher speed. In this case, even a slight displacement between the print head and the paper that can occur due to suspension and resuming of feeding of and printing on the paper may result in a white streak in letters or marks that have been printed, but it is possible to make such a streak hardly visually noticeable if there is any.

On the other hand, if such a white streak occurs when the information to be printed includes a bar code and the bar code includes the white streak, it is not possible to read the information of the bar code even if the streak is visually unnoticeable. Accordingly, when the information to be printed includes a bar code, as described above, upon completion of printing to a label, the paper is moved to the cut position without performing printing on a following label, and printing on the following label is performed after the paper is cut and moved backward. In this manner, as printing on the following label is not performed until a label that has been printed is separated from the paper, it is possible to prevent a white streak from occurring in a bar code without fail.

As described above, according to the conventional label printer, when the information to be printed does not include a bar code, it is possible to print at higher speed without moving the paper in a reverse direction, and when the information code includes a bar code, it is possible to print the information without fail.

CITATION LIST

Patent Literature

Japanese Unexamined Patent Application Publication No. 2002-178577

SUMMARY OF INVENTION

Technical Problem

In the meantime, there is often a case in which a QR code, a name known in the art as Quick Response Code, which is a two dimensional bar code that is machine readable, which is QR code M, as illustrated in FIG. 1A, is included as the information to be printed on a label (print area). The QR code M is configured such that finder patterns (positioning symbols) FD1, FD2, and FD3 are disposed at three corners of a square data area. The QR code M having such a structure records data with redundancy, and error correction is made possible when reading the data from the QR code (M). Accordingly, even if a part of the QR code (M) is unclean or damaged and the data is not readable correctly, from that part the data can be restored normally by the error correction.

As the data of the QR code M is restorable even when the code is unclean or damaged (e.g. containing a white streak), when printing the QR code M on labels, it is possible to separate labels sequentially while repeating suspension and resuming of feeding of and printing on the paper, instead of completing printing on a label first and separating the label from the paper, and then moving the paper backward to perform printing on a following label as in the case of printing of the bar code described above. Therefore, it is possible to print labels at higher speed.

However, if a white streak WL appears over the two finder patterns FD1 and FD2 at the same time as illustrated in a black line in FIG. 1B, the data of the QR code M may often not be capable of being restored. Accordingly, there is a case in which the data may not be restored from the printed QR code when sequentially separating while repeating suspension and resuming of feeding of and printing on the paper as described above.

The present invention has been made in view of the above situation, and aims to provide a printer capable of printing a QR code on print areas sequentially arranged along a sheet of paper at higher speed while maintaining the QR code always in a state in which its data can be restored.

Solution to Problem

A printer according to the present invention is configured as a printer for performing printing on print areas according to print data representing information to be printed, while sequentially moving a sheet of paper, along which the print areas are arranged at predetermined intervals, in a direction of the arrangement of the print areas. The printer is provided with: print operation control means for controlling a print operation so as to stop movement of the paper and to suspend printing on a print area and then to resume the movement of the paper and the printing on the print area. If the print data includes data representing a QR code to be printed in a predetermined orientation with respect to the print areas, the printer includes determination means for determining whether or not both of two finder patterns aligned along one side of the QR code in the print area for which the printing is suspended are at a position to be printed when the movement of the paper is stopped. The printer includes print operation correcting control means for controlling the print operation, when the determination means has determined that both of the two finder patterns aligned along one side of the QR code in the print area for which the printing is suspended are at the position to be printed when the movement of the paper is stopped, such that the two finder patterns of the QR code are not at the position to be printed at the same time.

The printer according to the present invention may be configured to perform printing on labels as the print areas according to the print data, and to sequentially separate a label that has been printed from the paper. In this case, when a boundary portion between a leading label that has been printed and a following label reaches a cut position, the print operation control means controls the print operation so as to stop the movement of the paper, suspend the printing to the label, cut the paper at the boundary portion to separate the leading label that has been printed from the paper, and then resume the movement of the paper and the printing on the label.

With the configuration described above, even if the print data includes data representing the QR code in which both of the two finder patterns aligned along one side are at the position to be printed when the movement of the paper is stopped in the print area (label) for which the printing is suspended, both of the two finder patterns aligned along one side of the QR code are not actually at the position to be printed at the same time when resuming the printing to the print area (label) for which the printing is suspended. Therefore, even if a white streak appears over a printed portion on the print area (label) due to the suspension and resuming of the movement of the paper and the printing, the white streak may not appear on both of the two finder patterns aligned along one side of the QR code.

The printer according to the present invention may be configured such that the print operation correcting control means controls the print operation so as to change an orientation of the QR code.

With such a configuration, the printing on each print area is performed by changing an orientation of the QR code such that both of the two finder patterns aligned along one side of the QR code are not at the position to be printed at the same time. Therefore, even if a white streak appears over the printed portion on the label due to the suspension and resumption of the movement of the paper and the printing, the white streak may not appear on both of the two finder patterns aligned along one side of the QR code. In particular, by changing the orientation of the QR code, it is possible to prevent both of the two finder patterns aligned along one side of the QR code from being at the position to be printed at the same time without changing the print position of the QR code in each print area to a large degree.

Further, the printer according to the present invention may be configured such that the print operation correcting control means controls the print operation such that the QR code is turned by 90 degrees.

With such a configuration, printing on each print area is performed by turning the QR code by 90 degrees such that both of the two finder patterns aligned along one side of the QR code are not at the position to be printed at the same time. Therefore, even if a white streak appears over the printed portion on the print area due to the suspension and resumption of the movement of the paper and the printing, the white streak may not appear on both of the two finder patterns aligned along one side of the QR code. In particular, by turning the square QR code by 90 degrees, it is possible to prevent both of the two finder patterns aligned along one side of the QR code from being at the position to be printed at the same time without changing visual appearance of a print state to a large degree.

Moreover, the printer according to the present invention may be configured such that the print operation correcting control means includes print data correction means for correcting the print data so that both of the two finder patterns are not at the position to be printed at the same time.

With such a configuration, the print data is corrected such that both of the two finder patterns aligned along one side of the QR code are not at the position to be printed at the same time. Therefore, when printing on the print areas of the paper moving according to the print data, even if a white streak appears over the printed portion on the print area due to the suspension and resumption of the movement of the paper and the printing, the white streak may not appear on both of the two finder patterns aligned along one side of the QR code.

Advantageous Effects of Invention

According to a label printer of the present invention, a print operation is performed so as to stop movement of a sheet of paper to suspend printing on a print area and then to resume the movement of the paper and the printing on the print area. Thus, it is possible to perform printing consecutively to the print areas while moving the paper in one direction, without moving alternatively in a reverse direction. At this time, even if a white streak appears over the printed portion on the print area due to the suspension and resumption of the movement of the paper and the printing, the white streak may not appear on both of the two finder patterns aligned along one side of the QR code. Therefore, it is possible to prevent occurrence of a situation in which it is not possible to restore data from the QR code printed on the labels. Thus, it is possible to print the QR code on the labels sequentially arranged along the paper at higher speed while maintaining the QR code always in a state in which its data can be restored.

BRIEF DESCRIPTION OF DRAWINGS

FIG. 10 is a diagram showing an example of relation in a label between a print-start position for finder patterns in the QR code, a cut position for cutting a sheet of paper, and a print position Pp by a thermal head.

DESCRIPTION OF EMBODIMENTS

Hereinafter, an embodiment of the present invention will be described with reference to the drawings.

Figure 1A:
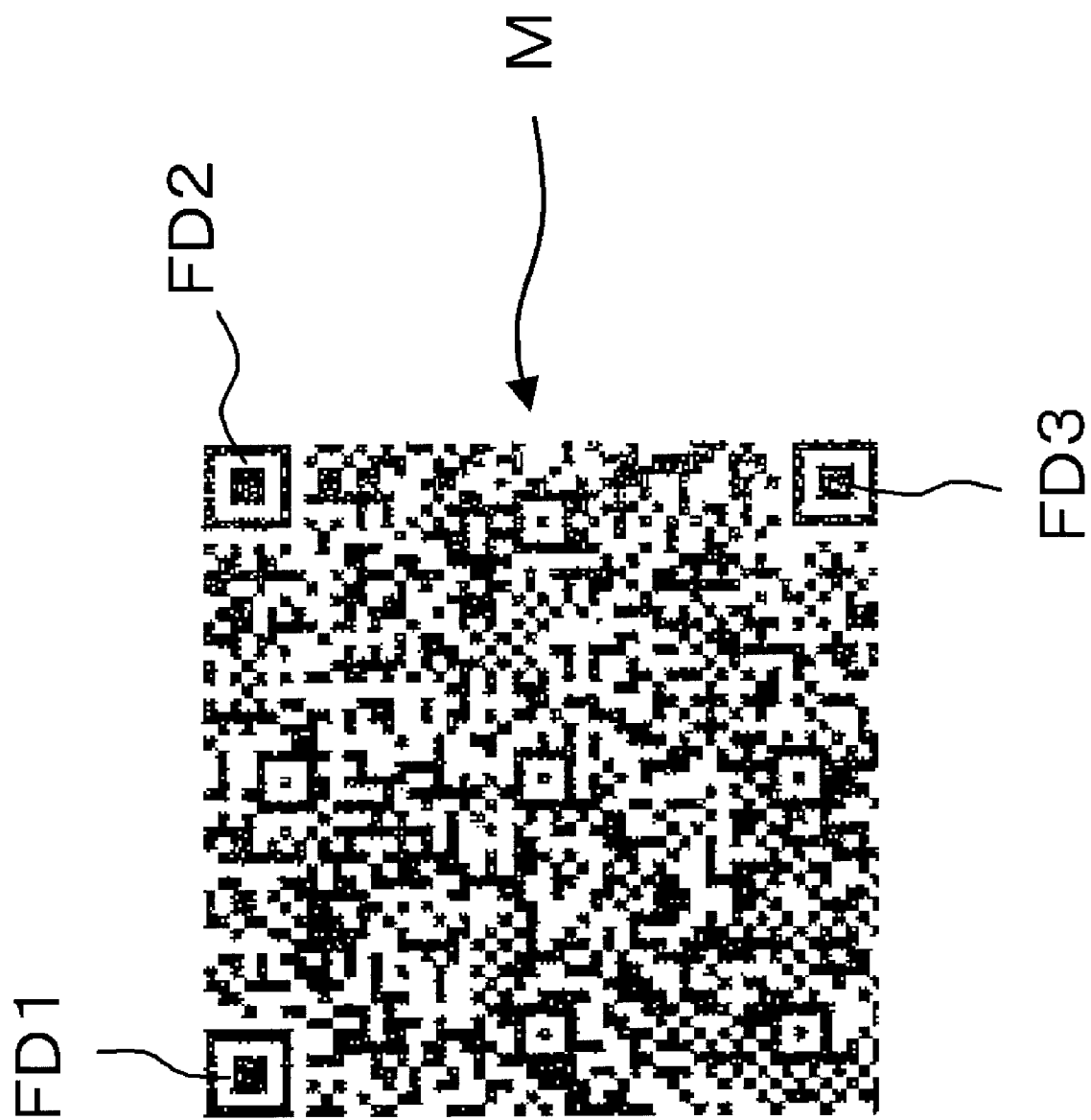
FIG. 1A is a diagram illustrating one example of a QR code.
Figure 1B:
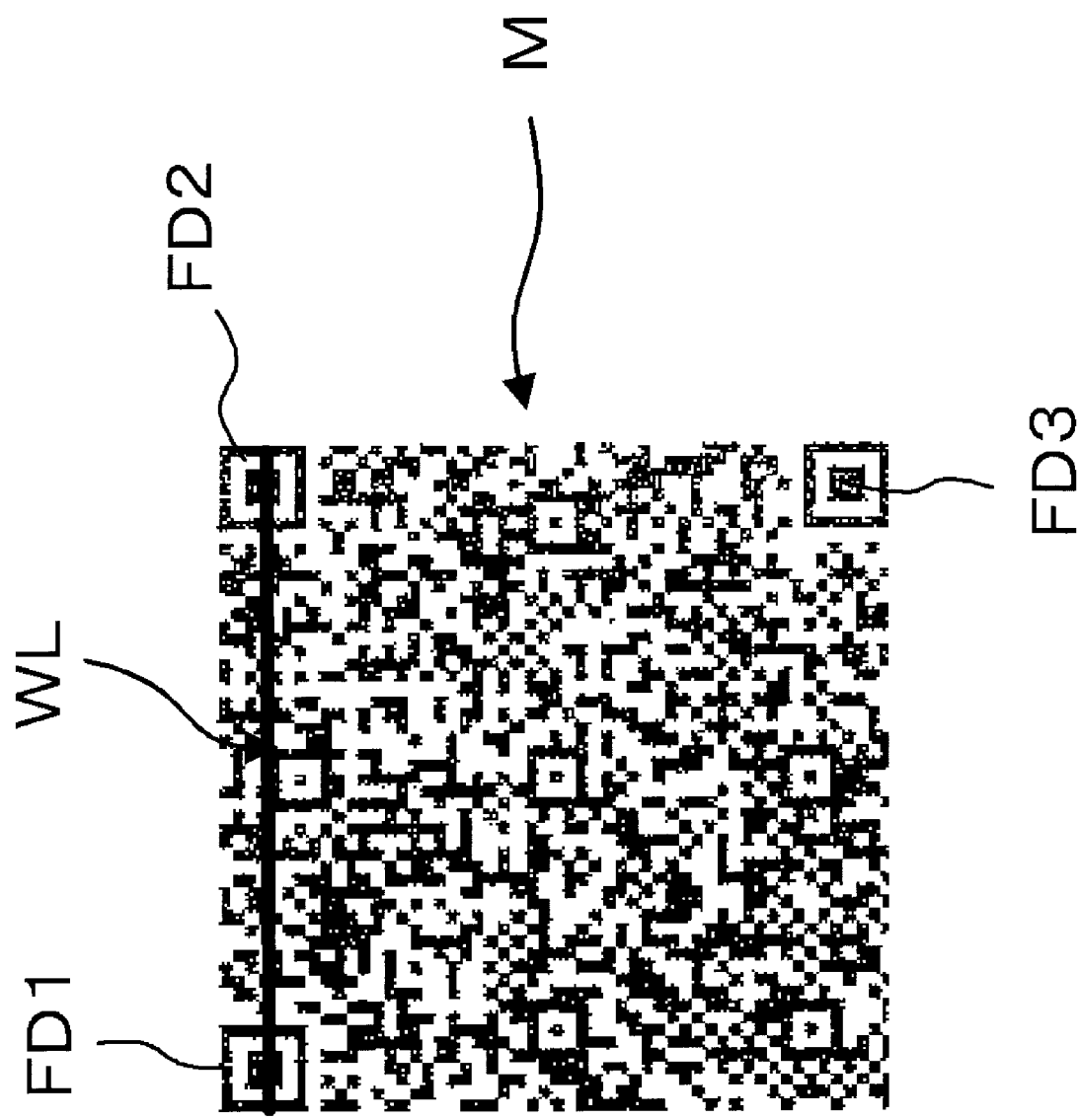
FIG. 1B is a diagram illustrating one example of the QR code over which a line of a white streak is disposed.
Figure 2:
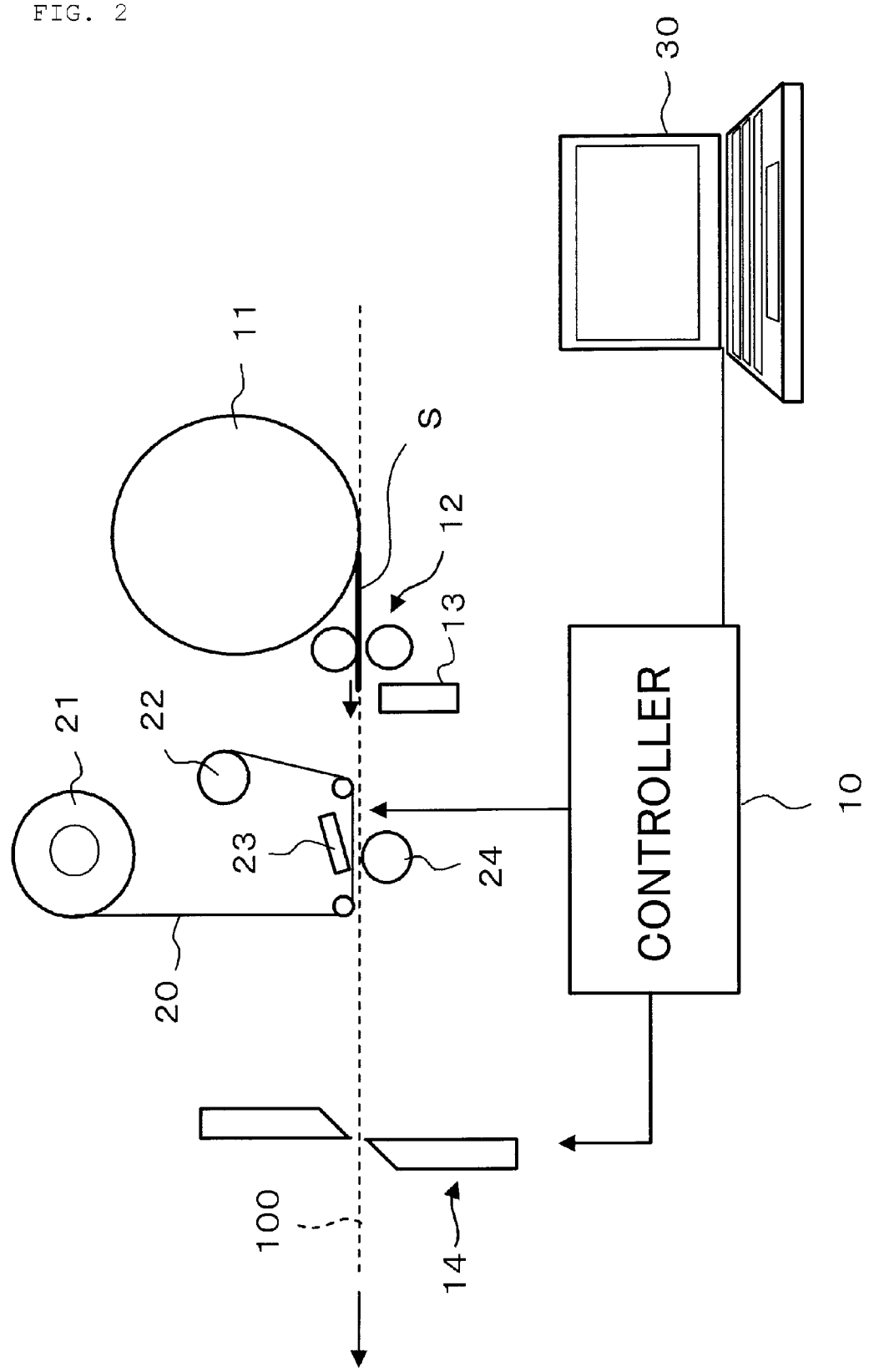
FIG. 2 is a diagram illustrating a printer (label printer) according to one embodiment of the present invention.

A printer (label printer) according to one embodiment of the present invention is constructed as illustrated in FIG. 2.

Referring to FIG. 2, a sheet of paper S having a liner of a predetermined width and labels (print areas) temporarily attached to the liner at predetermined intervals is rolled into a roll 11, and the paper S paid out from the roll 11 by a pay-out roller 12 moves along a paper transfer path 100. This label printer is a thermal-transfer printer, in which a thermal head 23 is disposed at a predetermined position along the paper transfer path 100, and a platen roller 24 is disposed so as to face against the thermal head 23. An ink ribbon 20 is suspended between a feed roller 21 and a take-up roller 22, and the ink ribbon 20 sent out from the feed roller 21 is wound up by the take-up roller 22 via a plurality of tension rollers. Further, the ink ribbon 20 and the paper S that moves along the paper transfer path 100 overlapping with each other pass through between the thermal head 23 and the platen roller 24.

At a predetermined neighborhood position of the pay-out roller 12, a paper position sensor 13 configured to detect a leading end of the paper S paid out from the roll 11 is provided. At a predetermined position on a downstream side from the position of the thermal head 23 (print position) along a moving direction of the paper S, a cutter 14 configured to cut the paper S is disposed.

This label printer includes a controller 10 configured to control a print operation. Based on a detection signal from the paper position detecting sensor 13, print data from an upper device 30 such as a personal computer, and information required for printing such as format data (print information), the controller 10 performs control relating to the print operation to each label (print area) of the paper S such as drive control of the thermal head 23 that performs thermal transfer of the ink ribbon 20 to the paper S, feed control of the paper S, and drive control of the cutter 14. Based on the print operation controlled by the controller 10, the information represented by the print data is printed on a predetermined area in labels of the paper S that moves along the paper transfer path 100, and the paper S is cut and the printed label is separated from the paper S.

Figure 3:
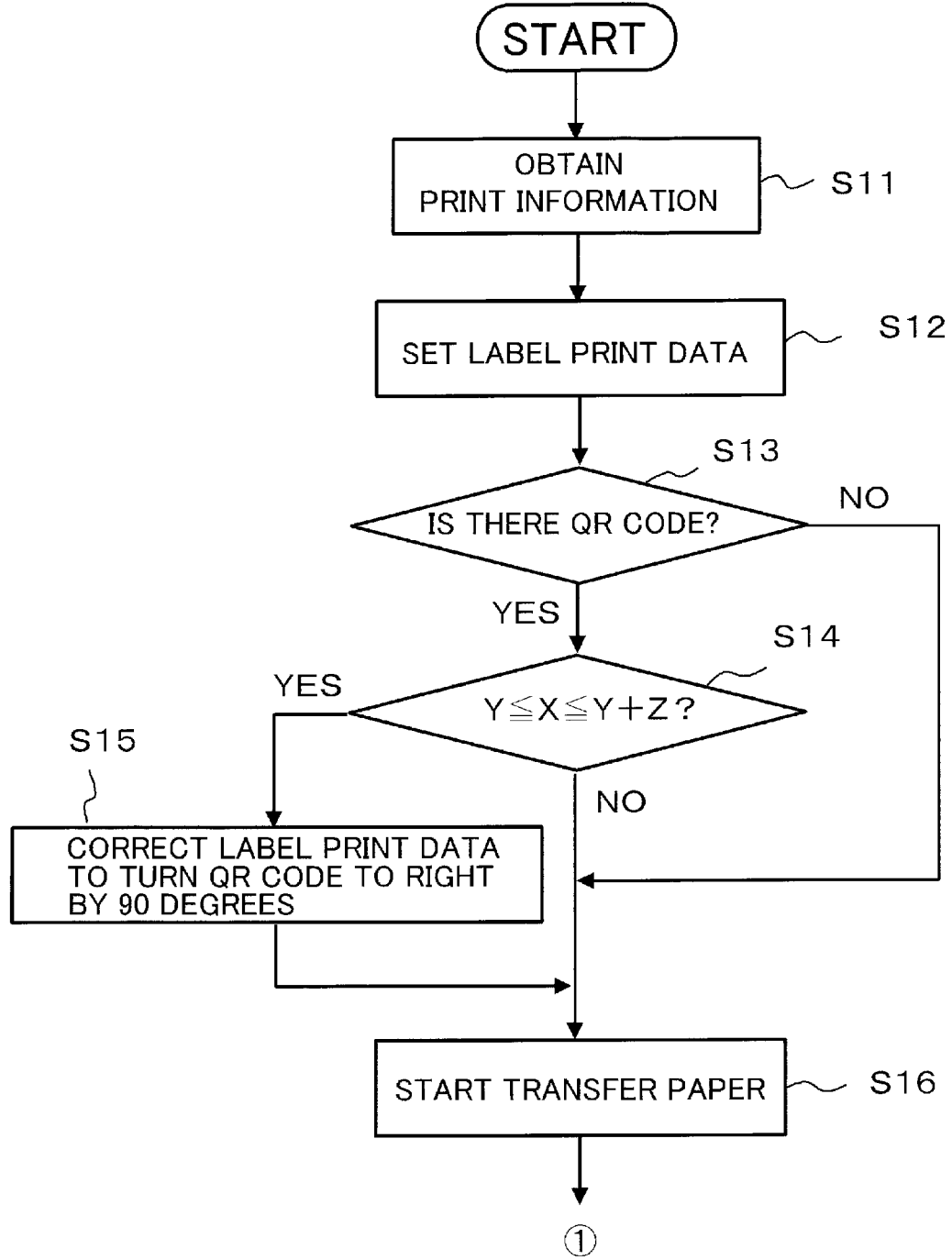
FIG. 3 is a flowchart showing a process flow of a print operation (part 1).

Next, operations of the label printer will be described. The controller 10 performs processing relating to the print operation according to procedures shown in FIG. 3 and FIG. 4.

Figure 5:
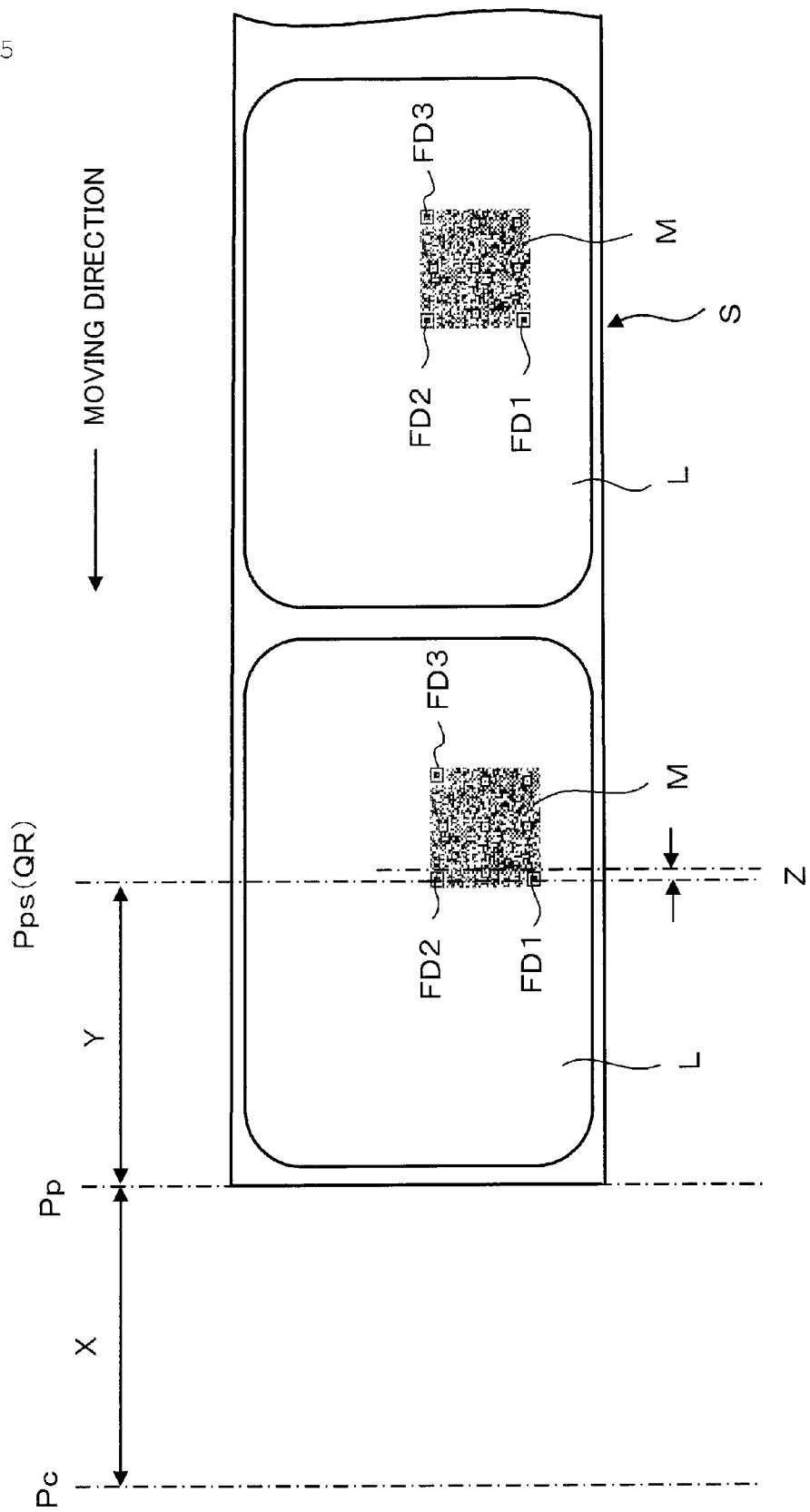
FIG. 5 is a diagram showing an example of relation in a label (print area) between a print-start position Pps for finder patterns in the QR code, a cut position Pp for cutting a sheet of paper, and a print position Pp by a thermal head.

Upon activation of the label printer, the paper S paid out from the roll 11 by the pay-out roller 12 is set at a position at which its leading end is detected by the paper position sensor 13 as illustrated in FIG. 2 (initial position). In this state, the controller 10 obtains print information required for printing such as print data representing information to be printed and format data representing a print format (such as position and shape of a label and the information to be printed), along with a print request, from the upper device 30 (personal computer) (S11), and extract the print data from the print information and sets the print data in a predetermined memory (S12). Thereafter, the controller 10 determines whether or not the print data includes data indicating a QR code to be printed in a predetermined orientation with respect to a label (for example, an orientation in which, as illustrated in FIG. 5, two finder patterns FD1 and FD2 on one side are aligned on a downmoststream side in a moving direction of the paper S along a direction perpendicular to the moving direction, and two finder patterns FD2 and FD3 on the other side are aligned in parallel to the moving direction of the paper S) (S13).

Figure 6:
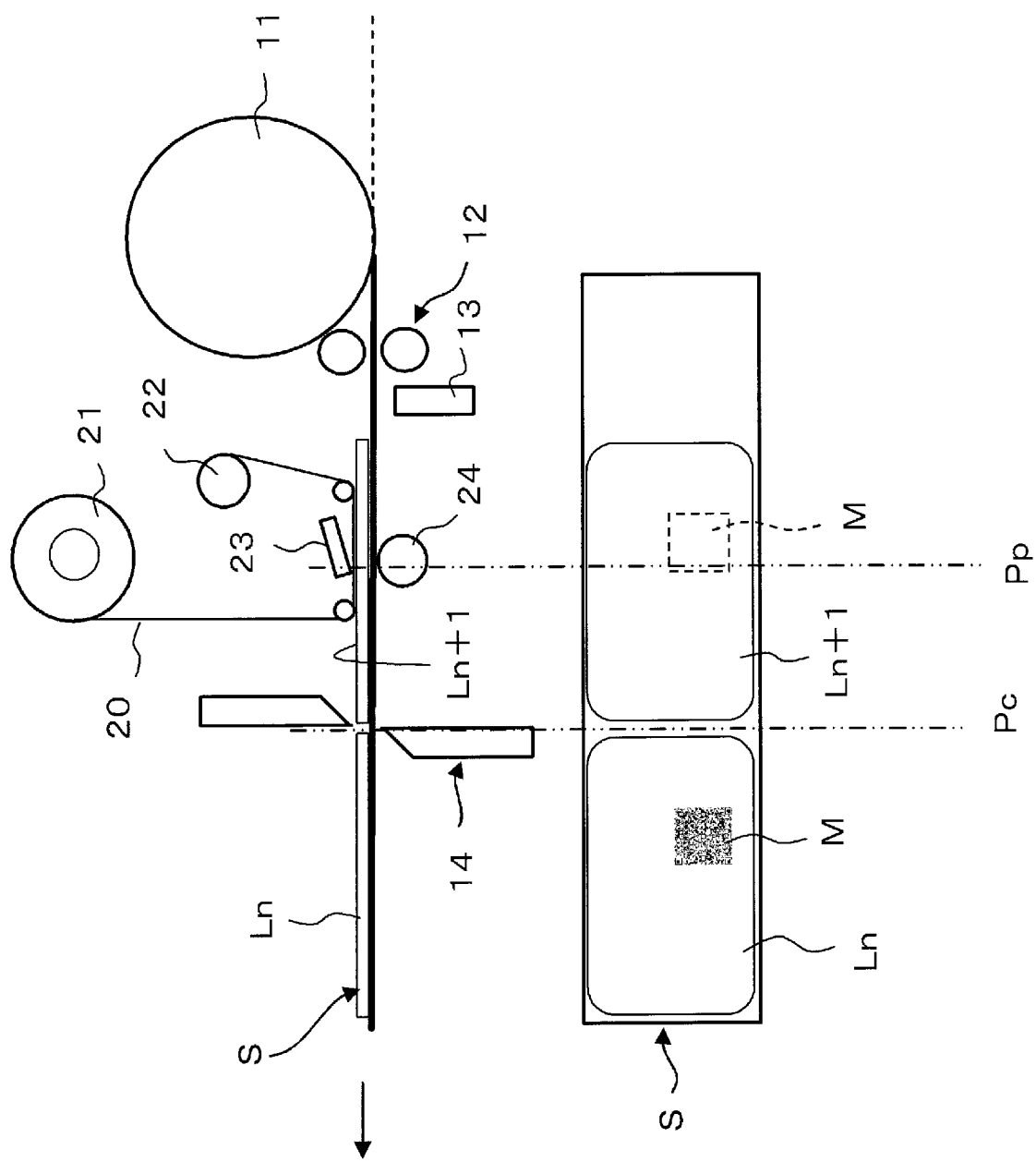
FIG. 6 is a diagram illustrating a state in which the paper is cut at a boundary portion between a leading label that has been printed and a following label in the label printer illustrated in FIG. 2.

If the print data includes data indicating a QR code to be printed in a predetermined orientation with respect to a label (YES in S13), in performing printing to each label of the paper S according to the print data based on the print data, the format data, and information relating to positions of the thermal head 23 and the cutter 14, the controller 10 further determines whether or not both of the finder patterns FD1 and FD2 aligned along one side of a QR code M in the label Ln+1 (see FIG. 5) are at a position Pp to be printed (print position: the position at which the thermal head 23 is disposed) when a boundary portion between a printed leading label Ln and a following label Ln+1 reaches a cut position Pc (the position at which the cutter 14 is disposed) as illustrated in FIG. 6 (S14). This is determined based on whether or not a condition $Y \le x \le Y+Z$ is satisfied, using a distance X between the cut position Pc (the position of the cutter 14) and the print position Pp (the position of the thermal head 23), a distance Y from the leading end of the paper S (cut position) to a position Pps (QR) at which the finder patterns FD1 and FD2 of the QR code M are aligned, and a width Z of each of the finder patterns FD1 and FD2 in the moving direction of the paper S, as illustrated in FIG. 5. If this condition is satisfied, it is determined that both of the finder patterns FD1 and FD2 aligned along one side of the QR code M in the following label Ln+1 (see FIG. 5) are at the position Pp to be printed (print position: position at which the thermal head 23 is disposed) when the boundary portion between the printed leading label Ln and the following label Ln+1 reaches the cut position Pc (the position at which the cutter 14 is disposed).

Figure 7:
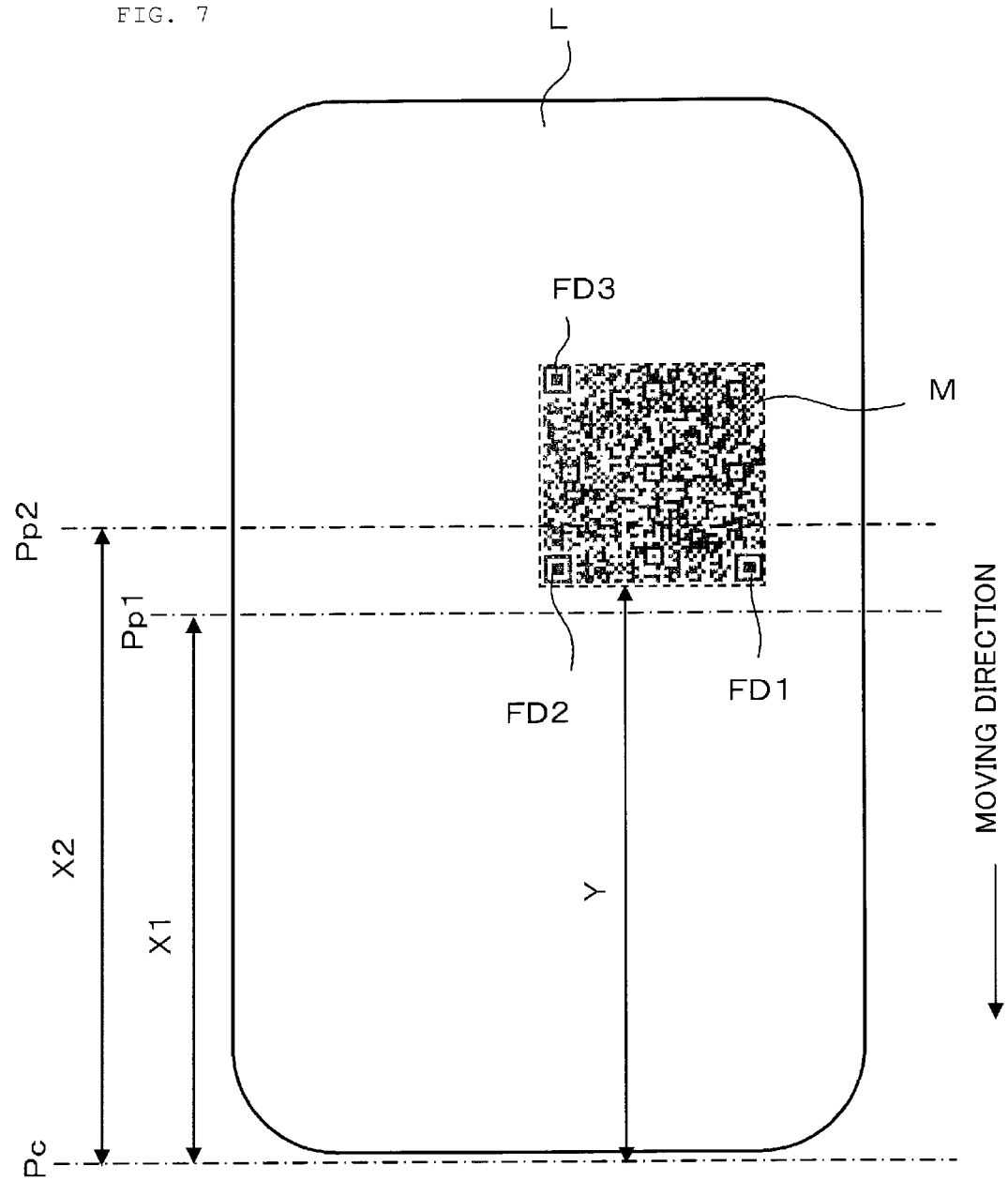
FIG. 7 is a diagram illustrating an example in which two finder patterns aligned along one side of the QR code are not at the print position at the same time.

On the other hand, if the condition based on X, Y and Z is not satisfied, for example, if a distance X1 between the cut position Pc and a print position Pp1 is smaller than the distance Y from the leading end of the paper S (cut position) to the finder patterns FD1 and FD2 of the QR code M as illustrated in FIG. 7, both of the finder patterns FD1 and FD2 aligned along one side of the QR code M in the following label Ln+1 (see FIG. 5) are not at the position Pp1 to be printed when the boundary portion between the printed leading label Ln and the following label Ln+1 reaches the cut position Pc. Alternatively, if a distance X2 between the cut position Pc and a print position Pp2 is greater than a sum (Y+Z) of the distance Y from the leading end of the paper S (cut position) to the finder patterns FD1 and FD2 of the QR code M and the width Z of the finder patterns FD1 and FD2 in the moving direction of the paper S, both of the finder patterns FD1 and FD2 aligned along one side of the QR code M in the following label Ln+1 (see FIG. 5) are beyond the position Pp2 when the boundary portion between the printed leading label Ln and the following label Ln+1 reaches the cut position Pc.

Figure 8:
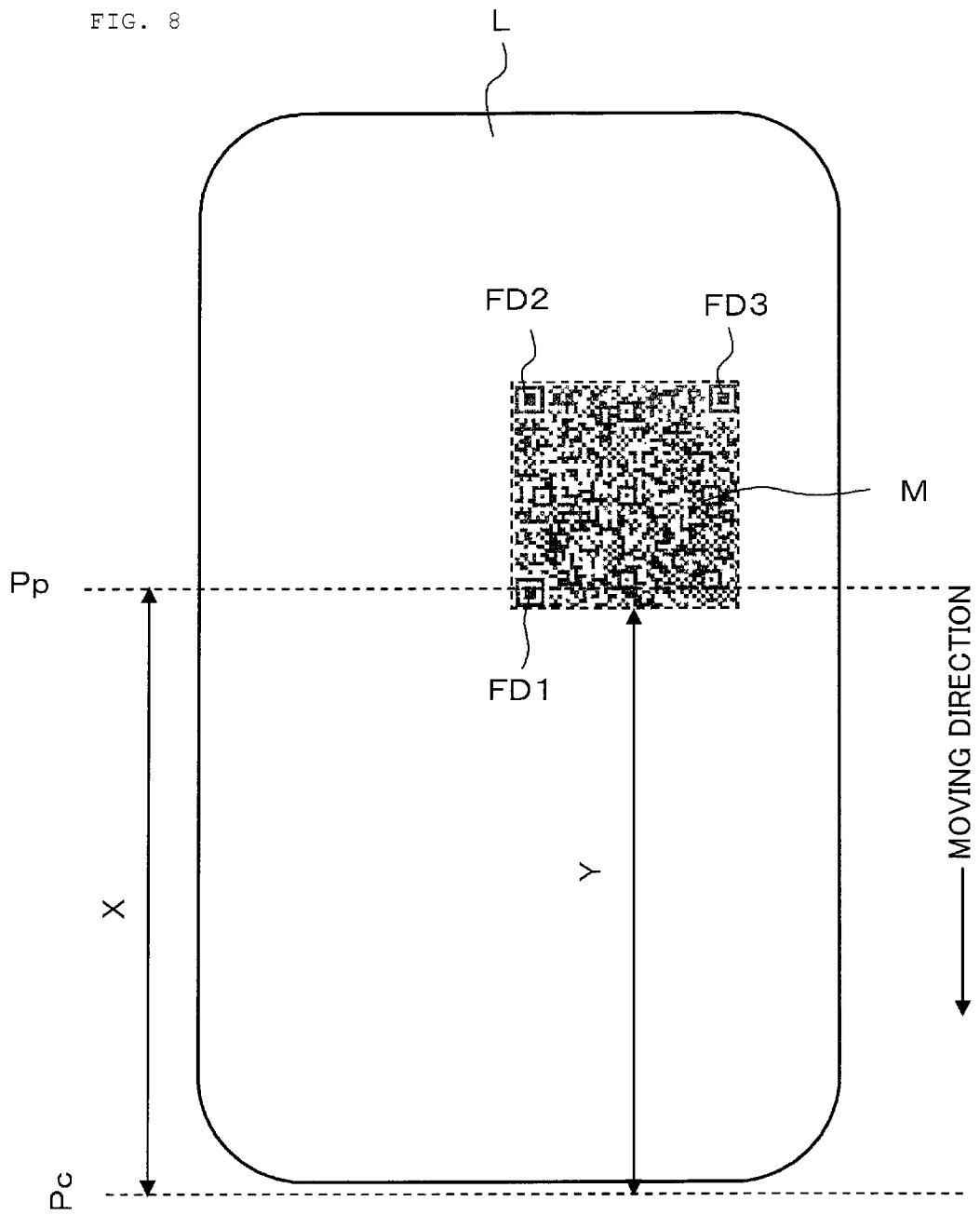
FIG. 8 is a diagram illustrating an example in which the QR code is turned by 90 degrees so that two finder patterns aligned along one side of the QR code may not come at the print position at the same time.

In the above determination (S14), if it is determined that both of the finder patterns FD1 and FD2 aligned along one side of the QR code M in the following label Ln+1 are at the position Pp when the boundary portion between the printed leading label Ln and the following label Ln+1 reaches the cut position Pc (YES in S14, see FIG. 5), the controller 10 corrects the print data by turning the QR code M to the right by 90 degrees to change its orientation (S15). With this, the two finder patterns in the QR code M may not come at the position Pp to be printed at the same time in the following label Ln+1 when the boundary portion between the printed leading label Ln and the following label Ln+1 reaches the cut position Pc, and only the finder pattern FD1 is located at the position Pp to be printed as illustrated in FIG. 8.

It should be noted that the set print data is not corrected, if the set print data does not include a QR code (NO in S13), or even when the print data includes a QR code (YES in S13), if not both of the two finder patterns (e.g., FD1 and FD2) aligned along one side of the QR code M in the following label Ln+1 are at position Pp (NO in S14, see FIG. 7) when the boundary portion between the printed leading label Ln and the following label Ln+1 reaches the cut position Pc.

As described above, upon setting of the print data (S12) or correction of the set print data (S12-S15), the controller 10 starts transfer control of the paper S whose leading end has been detected by the paper position sensor 13, as illustrated in FIG. 2 (S16). With this, the paper S starts to move along the paper transfer path 100 at a predetermined speed.

Figure 4:
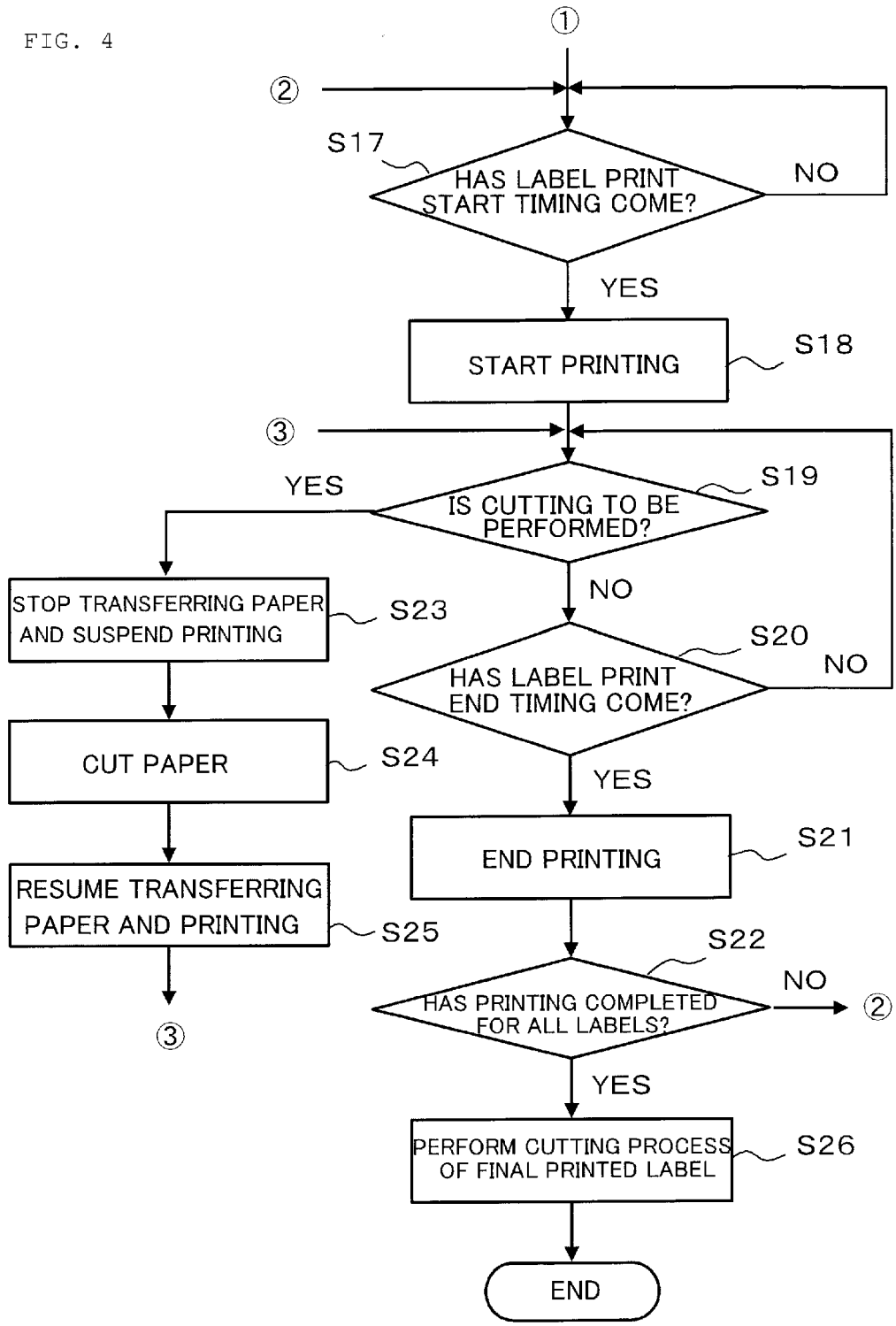
FIG. 4 is a flowchart showing the process flow of the print operation (part 2).

Upon starting of the movement of the paper S, the controller 10 moves to the process shown in FIG. 4, and monitors whether or not print start timing for the leading label of the paper S has come (S17). Whether or not the print start timing has come is determined based on, for example, whether a position on the label to start printing has reached the print position Pp (the position of the thermal head 23) based on a feed amount of the paper S, the format data (such as a size of the label, and a print-start position within the label), and the like. If it is determined that the print start timing for the leading label of the paper S has come (YES in S17), the controller 10 starts the drive control of the thermal head 23 based on the print data that has been set as described above (S18). With this, information based on the print data (such as letters, marks, or the QR code M) is printed on the leading label of the paper S that is moving.

While printing on the leading label, the controller 10 monitors whether or not the boundary portion between the leading label and the following label has reached the cut position Pc (S19) and whether or not end printing timing for the leading label has come (S20). Then, when the end printing timing for the leading label comes (YES in S20), the controller 10 stops the drive control of the thermal head 23 to terminate the printing (S21). Thereafter, the controller 10 determines whether or not printing on an instructed number of labels has been completed (S22), and if not (NO in S22), monitors whether or not print start timing for the following label has come (S17). When the print start timing for the following label has come (YES in S17), the controller 10 starts the drive control of the thermal head 23 based on the print data that has been set as described above (S18), and starts printing on the following label.

When printing on the following label starts, the controller 10 monitors whether or not the boundary portion between the leading label that has been printed and the following label has reached the cut position Pc (S19) and whether or not end printing timing for a next following label has come (S20). When the boundary portion between the leading label that has been printed and the following label that is being printed reaches the cut position Pc in the course of this process (YES in S19), the controller 10 stops transfer of the paper S and suspends the printing (S23). Then, the controller 10 controls the cutter 14 to cut the paper S (S24). With this, the leading label that has been printed is separated from the paper S. Subsequently, the controller 10 resumes transferring the paper S and printing on the following label (S25).

Thereafter, the controller 10 resumes monitoring whether or not a boundary portion between the label that is being printed and the next following label has reached the cut position Pc (S19) and whether or not end printing timing for the label that is being printed has come (S20). Then, when the end printing timing comes (YES in S20), the controller 10 stops the drive control of the thermal head 23 to terminate the printing (S21). Thereafter, the controller 10 executes the same procedures (S17-S25) repeatedly until the printing on all of the instructed number of labels is completed (S22). As a result, in the printing on each of the labels of the paper S that is moving (S18→S21), when the boundary portion between the leading label that has been printed and the label that is being printed reaches the cut position Pc (S19), the paper S stops moving and the printing on the following label is suspended (S23), the paper is cut at the boundary portion (S24) and the leading label that has been printed is separated from the paper S, and then the movement of the paper S and the printing on the following label are resumed (S25).

It should be noted that when the printing on all of the instructed number of labels is completed (YES in S22), the controller 10 performs a cutting process for a last printed label (S26). With this process, the paper S moves until the leading label that is to be last printed reaches the cut position Pc without printing on the following label. Then, when the boundary portion between the leading label that has been printed and the following label reaches the cut position Pc, the paper S is cut by the cutter 14, and the last label that has been printed is separated from the paper S.

Figure 9:
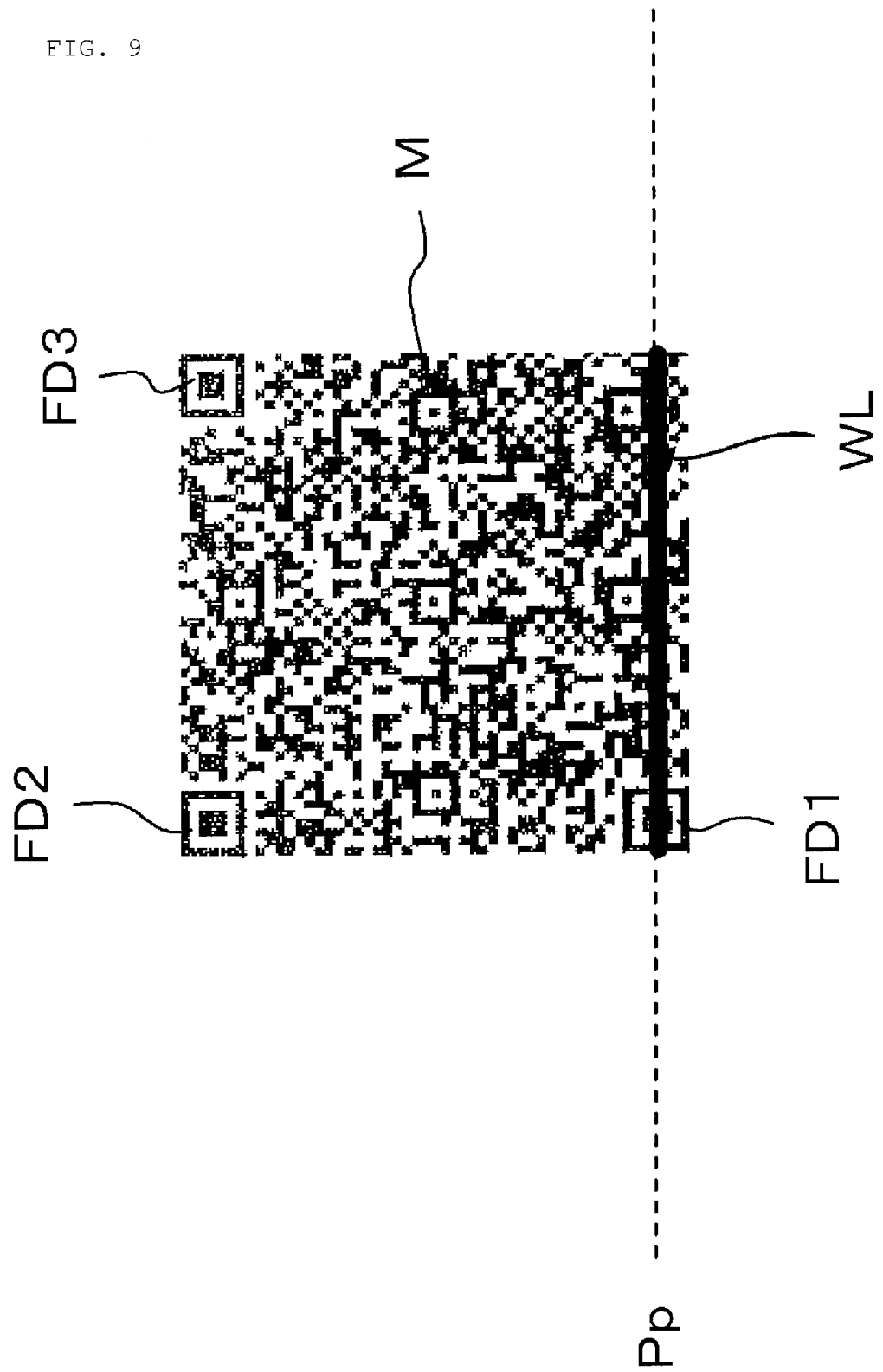
FIG. 9 is a diagram illustrating an example in which a white streak is over the QR code illustrated in FIG. 7.

According to the print operation described above, in printing on the labels of the paper S based on the print data, when the boundary portion between the leading label that has been printed and the label that is being printed reaches the cut position Pc, the paper S stops moving and the printing on the following label is suspended (see S23), the paper is cut at the boundary portion (see S24), and the leading label that has been printed is separated from the paper S and then the movement of the paper S and the printing on the following label are resumed (see S25). Thus, it is not required to move the paper S in a reverse direction after the printed label is separated from the paper S in order to move the following label back to the print position Pp, and it is possible to perform printing successively on the labels. Therefore, it is possible to perform printing on the labels of the paper S at higher speed. Further, when the boundary portion between the leading label that has been printed and the label that is being printed reaches the cut position Pc, if both of the two finder patterns FD1 and FD2 aligned along one side of the QR code M are at the print position Pp (YES in S14), the print data is corrected by turning the QR code M to the right by 90 degrees (see FIG. 8). Thus, even if the white streak WL appears over a printed portion on a label due to the suspension and resuming of the movement of the paper S and the printing, the white streaks WL appears only on the finder pattern FD1 of the QR code M as illustrated in FIG. 9. As the white streaks WL may not appear over both of the two finder patterns FD1 and FD2 aligned along one side of the QR code that is printed on the labels at the same time, it is possible to prevent a situation in which it is not possible to restore data from the QR code M printed on the labels from occurring. Thus, it is possible to print the QR code M on the labels sequentially arranged along the paper S at higher speed while maintaining the QR code always in a state in which its data can be restored.

In particular, turning the square QR code M by 90 degrees prevents the two finder patterns FD1 and FD2 from positioning at the print position Pp at the same time, a physical appearance of the QR code M that has been printed does not vary to a large extent (see FIG. 7 and FIG. 8). It should be noted that the method of preventing the two finder patterns FD1 and FD2 from positioning at the print position Pp at the same time is not limited to the above example, and the QR code M may be turned by an angle of any degrees, or may be moved forward, backward, rightward, or leftward.

In the example described above, the print data includes the data indicating the QR code M to be printed in the orientation in which, as illustrated in FIG. 5, the two finder patterns FD1 and FD2 on one side are aligned on the downstream side in the moving direction of the paper S along the direction perpendicular to the moving direction, and the two finder patterns FD2 and FD3 along the other side are aligned in parallel to the moving direction of the paper S. However, the present invention is not limited to such an example, and it is possible to perform the print operation described above, for example, in a case where the print data includes the data indicating the QR code M to be printed in an orientation in which, as illustrated in FIG. 10, the two finder patterns FD2 and FD3 on one side are aligned on an uppermost stream side in the moving direction of the paper S along the direction perpendicular to the moving direction, and the two finder patterns FD1 and FD2 along the other side are aligned parallel to the moving direction of the paper S. In this case, the QR code M may be turned to the left by 90 degrees when the distance X between the cut position Pc and the print position Pp, the distance Y from the leading end of the paper S (the cut position Pc of the paper S) to the two finder patterns FD2 and FD3, and the width Z of the finder patterns FD2 and FD3 satisfy the previously described condition, that is Y≧X Y+Z (see the situation illustrated in FIG. 7).

According to the label printer described above, the printing on the following label Ln+1 is performed when the boundary portion between the printed leading label Ln and the following label Ln+1 reaches the cut position Pc as illustrated in FIG. 6. However, depending on the arrangement and pitches of the labels on the paper S and the position of the cutter 14, there is a case in which printing on a label on an upstream side of the following label Ln+1 is performed when the boundary portion between the printed leading label Ln and the following label Ln+1 reaches the cut position Pc.

Further, according to the label printer described above, the print operation is controlled so as to stop the movement of the paper S and suspend the printing on the label Ln+1, as illustrated in FIG. 6, when the boundary portion between the printed leading label Ln and the following label Ln+1 reaches the cut position Pc, to cut the paper at the boundary portion to separate the printed leading label Ln from the paper, and then to resume the movement of the paper S and the printing on the label Ln. However, the print operation may not be particularly limited to this as long as the movement of the paper is stopped for some reason to suspend printing on the label, and then the movement of the paper and the printing on the label are resumed. For example, the print operation may be controlled such that the movement of the paper S is stopped and the printing on the label Ln+1 is suspended when the printed leading label Ln reaches the separation position, the printed label Ln is separated from the liner and applied to a predetermined object, and then the movement of the paper S and the printing on the label Ln are resumed.

Moreover, as the paper S along which the print areas are arranged, in addition to the paper having a liner and labels temporarily attached to the liner as described above, a sheet of strip-shaped paper on which tags having holes at regular intervals are provided as the print areas, or a sheet of paper having labels without a liner arranged thereon as the print areas may be employed.

It should be noted that the label printer according to the present invention is not limited to a thermal printer, and may be a printer of a different type.

Industrial Applicability

As described above, the label printer according to the present invention provides an effect of enabling printing of a QR code on labels sequentially arranged along a sheet of paper at higher speed while maintaining the QR code always in a state in which its data can be restored, and useful as a label printer configured such that in the process of movement of a sheet of paper having liner and labels temporarily attached to the liner at regular intervals moves, a printed label is separated from the paper while performing printing to the labels.

REFERENCE SIGNS LIST

10 Controller
11 Roll
12 Pay-Out Roller
13 Paper Position Sensor
14 Cutter
20 Ink Ribbon
21 Feed Roller
22 Take-Up Roller
23 Thermal Head (Print Head)
24 Platen Roller
30 Upper Device (Personal Computer)
100 Paper Path

The invention claimed is:

1. A printer for printing on print areas according to print data representing information to be printed, while sequentially moving a sheet of paper, along which the print areas are arranged at predetermined intervals, in a direction of an arrangement of the print areas, the printer comprising:
   a print operation controller for controlling a print operation of the printer so as to stop movement of the paper to suspend printing on a print area and then to resume the movement of the paper and the printing on the print area;
   a determination device for determining if the print data includes data representing a QR code to be printed in a predetermined orientation with respect to the print areas, whether or not both of two finder patterns aligned along one side of the QR code in the print area for which the printing is suspended are at a position to be printed when movement of the paper is stopped; and
   a print operation correcting control configured for controlling the print operation, when the determination device has determined that both of the two finder patterns aligned along one side of the QR code in the print area for which the printing is suspended are at their positions to be printed when the movement of the paper is stopped, such that the two finder patterns of the QR code are not at respective positions to be printed at the same time.

2. The printer according to claim 1, wherein the printer is configured to print on labels at the print areas according to the print data, and to sequentially separate a label that has been printed from the paper, and when a boundary portion between a leading label that has been printed and a following label reaches a label cut position, the print operation controller is configured and operable to control the print operation to stop movement of the paper, suspend the printing on the label, cut the paper at a boundary portion to separate a leading label that has been printed from the paper, and then resume the movement of the paper and to resume the printing on the label.

3. The printer according to claim 1, wherein the print operation correcting control is configured and operable to control the print operation to change an orientation of the QR code.

4. The printer according to claim 3, wherein the print operation correcting control is configured and operable to control the print operation such that the QR code is turned by 90 degrees.

5. The printer according to claim 1, wherein the print operation correcting control includes a print data correction device for correcting the print data so that both of the two finder patterns are not at the position to be printed at the same time.

6. A printer for printing on print areas according to print data representing information to be printed, while sequentially moving a sheet of paper, along which the print areas are arranged at predetermined intervals, in a direction of an arrangement of the print areas, the printer comprising:

a print operation controller for controlling a print operation of the printer so as to stop movement of the paper to suspend printing on a print area and then to resume the movement of the paper and the printing on the print area;

a determination device for determining if the print data includes data representing a bar code to be printed in a predetermined orientation with respect to the print areas, whether or not both of two finder patterns aligned along one side of the bar code in the print area for which the printing is suspended are at a position to be printed when movement of the paper is stopped; and a print operation correcting control configured for controlling the print operation, when the determination device has determined that both of the two finder patterns aligned along one side of the bar code in the print area for which the printing is suspended are at their positions to be printed when the movement of the paper is stopped, such that the two finder patterns of the bar code are not at respective positions to be printed at the same time.

7. The printer according to claim 6, wherein the printer is configured to print on labels at the print areas according to the print data, and to sequentially separate a label that has been printed from the paper; and when a boundary portion between a leading label that has been printed and a following label reaches a label cut position, the print operation controller is configured and operable to control the print operation to stop movement of the paper, suspend the printing on the label, cut the paper at a boundary portion to separate a leading label that has been printed from the paper, and then resume the movement of the paper and to resume the printing on the label.

8. The printer according to claim 6, wherein the print operation correcting control is configured and operable to control the print operation to change an orientation of the bar code.

9. The printer according to claim 8, wherein the print operation correcting control is configured and operable to control the print operation such that the bar code is turned by 90 degrees.

10. The printer according to claim 6, wherein the print operation correcting control includes a print data correction device for correcting the print data so that both of the two finder patterns are not at the position to be printed at the same time.

\* \* \* \* \*